No. 618,731. Patented Jan. 31, 1899.
F. RHEAULT.
ROWLOCK.
(Application filed July 21, 1898.)
(No Model.)
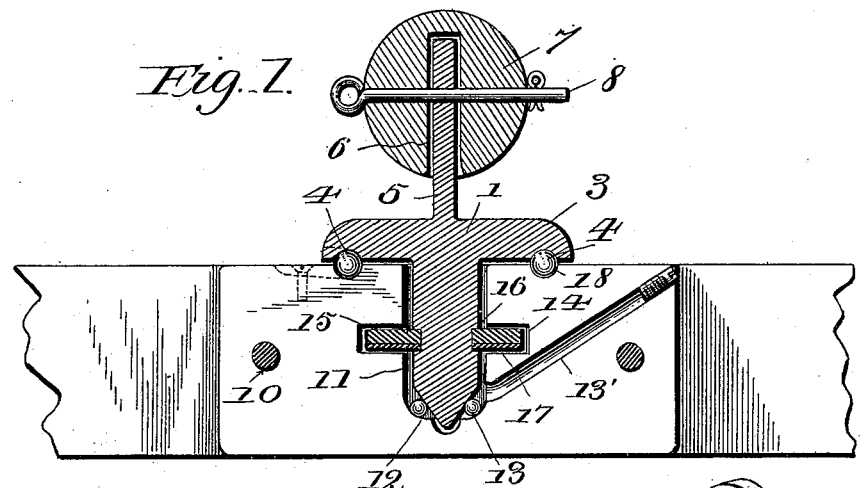
Witnesses
L. C. Hills.
H. L. Amer.
Inventor
Frank Rheault,
by O. S. Stockbridge
Attorney

UNITED STATES PATENT OFFICE.

FRANK RHEAULT, OF BARAGA, MICHIGAN.

ROWLOCK.

SPECIFICATION forming part of Letters Patent No. 618,731, dated January 31, 1899.

Application filed July 21, 1898. Serial No. 686,545. (No model.)

*To all whom it may concern:*

Be it known that I, FRANK RHEAULT, a citizen of the United States, residing at Baraga, in the county of Baraga and State of Michigan, have invented certain new and useful Improvements in Oar-Locks; and I do hereby declare the following to be a full, clear, and exact description of the invention, such as will enable others skilled in the art to which it appertains to make and use the same.

This invention relates to oar-locks, and has for its object to provide an oar-lock of novel construction whereby the disagreeable and monotonous squeaking and grinding of an oar-lock and the oar will be entirely obviated, at the same time securing a strong and durable construction and reducing to a minimum the friction between the oar and oar-lock and between the oar-lock and socket.

The detailed objects and advantages of the invention will appear in the course of the ensuing description.

The invention consists in an improved oar-lock embodying certain novel features and details of construction and arrangement of parts, as hereinafter fully described, illustrated in the drawings, and incorporated in the claims.

In the accompanying drawings, Figure 1 is a sectional view through an oar-lock and a portion of an oar constructed in accordance with this invention. Fig. 2 is a detail perspective view of one of the oar-lock socket-sections. Fig. 3 is a similar view of the spindle of the oar-lock, including the head and lug. Fig. 4 is a cross-section through the oar-lock.

Similar numerals designate corresponding parts of the views.

The oar-lock contemplated in this invention comprises a spindle 1, the lower extremity of which is rounded or substantially hemispheroidal, for a purpose hereinafter described. The spindle 1 is of any suitable length and is provided at its upper end with an enlarged circular or disk-shaped head 3, which is provided upon its under side with an annular ball race or groove 4. Upon its upper side the head 3 is provided with an upwardly-projecting lug or ear 5, which enters a correspondingly-shaped recess 6 in the under side of the oar, a section of which is indicated at 7, the oar being pivotally connected on a horizontal axis to the lug 5 by means of a pin or bolt 8, as shown.

The oar-socket is composed of two sections 9, which meet on a central vertical line, or, in other words, the oar-socket is divided longitudinally and centrally into two equal parts and secured together by bolts or other suitable fasteners passing through openings 10 in the end portions of the socket-sections. At the point of junction of the two sections the latter are recessed in their meeting faces to form a vertical cavity 11, in which the spindle 1 is received. The cavity 11 is continued below the lowest point of the spindle 1, so as to leave around the lower extremity of the spindle a hemispheroidal ball race or cup 12, in which a series of antifriction-balls 13 are placed. Communicating with the ball-race 12 is an oblique groove 13', which extends toward the end of one of the upper corners of the oar-socket, the said oblique groove being designed to receive the antifriction-balls and enable the same to be carried downward to the race 12. After the balls are inserted a stopper may be inserted in the outer end of the groove to prevent the possible escape of the balls.

At a point intermediate the length of the cavity 11 the sections 9 are recessed, as indicated at 14, to form a horizontally-disposed circular cavity, in which is mounted an annular shoulder 15, surrounding the spindle 1 at a point intermediate its height. The shoulder 15 is preferably in the form of a washer, having a central opening to receive the spindle, the opening being of less diameter than the greatest diameter of the spindle 1, so that the inner edge of the washer fits in the annular groove 16 in the spindle, thereby preventing the washer from moving longitudinally on the spindle.

At one or both sides of the washer or shoulder 15 packing-rings 17 may be provided for the purpose of preventing the admission of water to the balls 13 and the escape of oil from the ball-race 12.

The socket is also provided in its upper surface with an annular ball-race 18, which lies coincidently opposite the race 4 in the head 3, and a series of antifriction-balls is placed in the grooves 4 and 18, thus serving to support the oar and head 3 horizontally.

From the foregoing description it will be seen that the oar-lock is supported at two independent points upon antifriction-balls which travel in recesses in the socket-sections. The oar is supported mainly upon the upper series of balls in the grooves 4 and 18, while any tendency of the spindle 1 to tilt or cant is overcome by the balls in the lower end of the cavity 11. The shoulder 15 prevents the possibility of the oar-lock becoming displaced unless the sections 9 are disconnected, which cannot happen unless one or both of the sections is purposely detached from the boat and from the other section. The oars may be detached by simply detaching the pins or bolts 8.

Having thus described the invention, what is claimed as new, and desired to be secured by Letters Patent, is—

1. The combination with an oar-socket divided centrally and longitudinally to form separate sections, said socket having a vertically-extending cavity therein, of an oar-lock comprising a head superimposed upon the socket, a depending spindle connected to the head and extending into the cavity of the socket, a shoulder on said spindle for preventing displacement thereof, a ball-cavity located beneath the lower end of the spindle, antifriction-balls therein, a ball-race in the upper side of the socket, antifriction-balls therein, and means provided for the attachment of the oar to the oar-lock, substantially as described.

2. In an oar-lock, the combination with a recessed socket-piece, of a vertical spindle rotatably mounted therein, provision whereby the oar may be pivotally connected to said spindle, an annular shoulder in the form of a washer fitting in an annular recess in the spindle and lying in a recess in the socket-piece, and a packing-washer arranged at one side of said shoulder, substantially as described.

3. In an oar-lock, the combination with a socket-piece having a vertical cavity therein, of a vertical spindle rotatably mounted in said cavity, provision for the attachment of the oar thereto, a ball-race extending below and around the lower end of the spindle, and an oblique groove leading from said ball-race outward, substantially as and for the purpose specified.

In testimony whereof I affix my signature in presence of two witnesses.

FRANK RHEAULT.

Witnesses:
EDWARD L. STONE,
CHARLES A. SHAVER.